Patented June 13, 1944

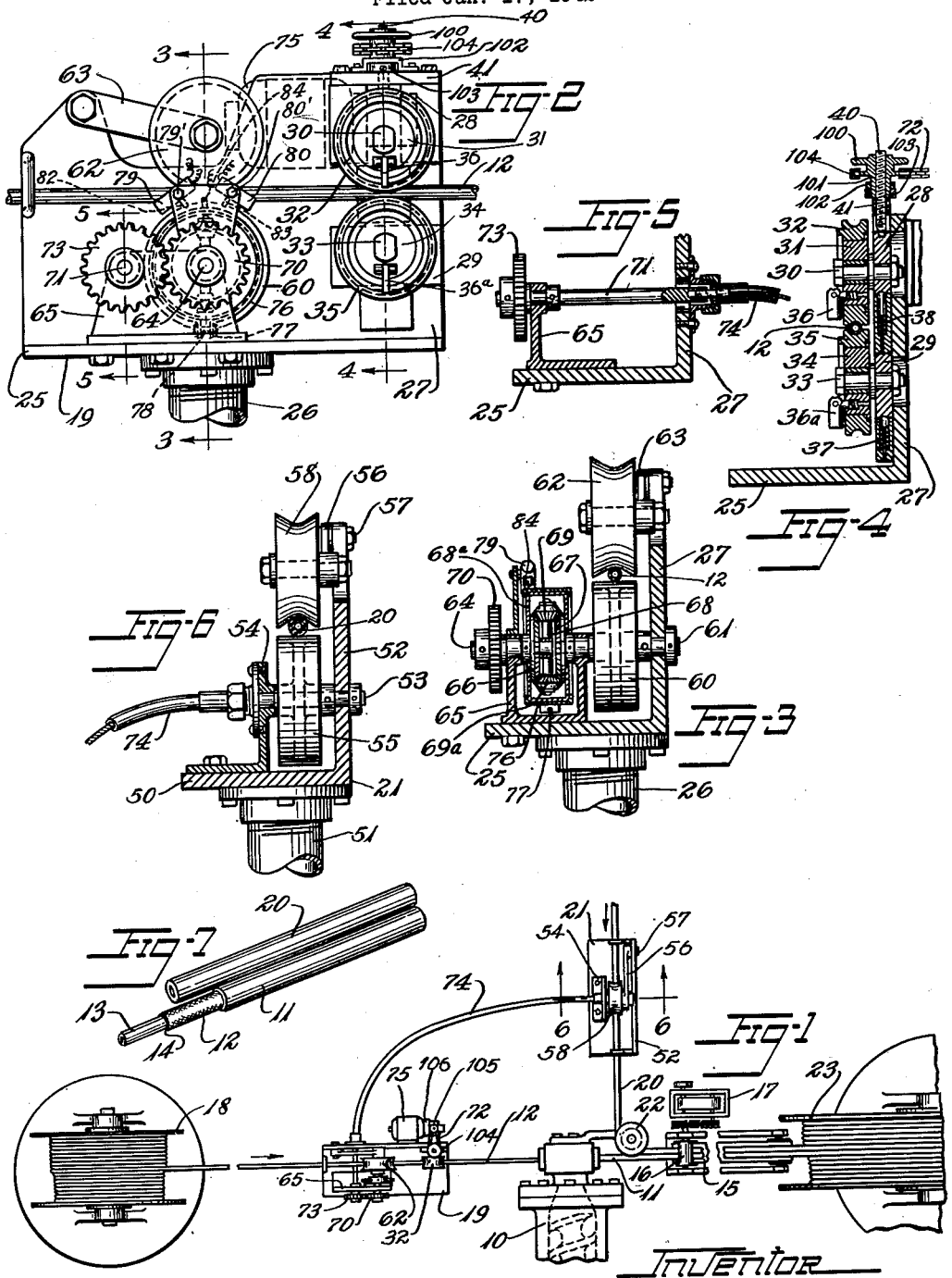

2,351,111

UNITED STATES PATENT OFFICE 2,351,111

ASSEMBLING STRIP MATERIAL

Edward A. Davis, Akron, Ohio, assignor to The B. F. Goodrich Company, New York, N. Y., a corporation of New York Application January 17, 1942, Serial No. 427,193

7 Claims. (Cl. 154—8)

This invention relates to progressively uniting strip elements to each other in side-by-side relation and is especially useful in the manufacture of plural-passage hose or the like.

In the manufacture of plural-passage hose it is desired to assemble parallel flexible tubes united to each other side-by-side, such hose elements each comprising a rubber inner lining, a reinforcement of textile material thereabout, and a covering of rubber-like material. By uniting the coverings of rubber-like material to each other before vulcanization of the hose, the hose elements are joined side-by-side to provide a plural-passage hose which can be reeled and handled as a single hose.

Difficulties have in the past been encountered in uniting the hose elements progressively due to difference in tension of the elements resulting in hose which has not lain or reeled straight. The present invention aims to overcome these and other difficulties.

The principal objects of the invention are to provide a plural-passage hose which will lie and reel straight, to provide control of tension during assembly of the hose elements, to provide a visual indication of difference in speed of the hose elements at the position of assembly, and to provide automatic control of speed of the hose elements.

These and other objects will appear from the following description and the accompanying drawing.

Of the drawing,

Fig. 1 is a plan view of apparatus embodying and constructed in accordance with the invention, parts being broken away.

Fig. 2 is a side elevation, to a larger scale, of the tensioning mechanism, parts being broken away.

Fig. 3 is a detail cross-sectional view, taken on lines 3—3 of Fig. 2.

Fig. 4 is a detail cross-sectional view, taken on lines 4—4 of Fig. 2.

Fig. 5 is a detail cross-sectional view taken on lines 5—5 of Fig. 2.

Fig. 6 is a detail cross-sectional view taken on lines 6—6 of Fig. 1, parts being broken away.

Fig. 7 is a perspective view of a twin hose, parts being broken away in steps.

In accordance with the invention, a strip of material is tensioned and progressively coated with an adhesive coating while a second strip is drawn from a supply thereof and progressively adhered thereto, and the tension of the first strip is controlled to match its speed at the position of assembly with the speed of the second strip.

In the illustrative embodiment of the invention of the drawing, an uncovered hose element is progressively drawn through an extruder under tension from a supply thereof and an adhesive covering is applied thereabout by the extruder, a previously covered unvulcanized hose element is drawn from a second supply into progressive side-by-side engagement with the first element as the first element leaves the extruder, the feeding speeds of the two elements are progressively compared, and the tension of the first element is adjusted to deliver the elements at the assembling position at uniform speeds.

Referring to the drawing, the numeral 10 designates an extruder of the side delivery or insulating type adapted to apply an adhesive covering 11 of unvulcanized rubber-like material progressively to a partially completed hose element 12 comprising a tubular lining 13 of rubber-like material and a reinforcement 14 thereabout of braid or other textile material. The hose element 12 is drawn through the extruder by a conveyor belt 15 and a pressure roll 16 thereover which engages the assembled hose, the conveyor belt being driven from any convenient source of power (not shown) by a variable speed drive 17 which may be of the Reeves type. A reel 18 of the uncovered hose material 12 is provided ahead of the extruder and a tensioning mechanism 19 is located between the reel and the extruder to tension the material.

A second hose element 20 having an unvulcanized rubber covering thereon, is drawn from another reel (not shown) through a speed-measuring mechanism 21 and about a grooved guide pulley 22 mounted for free rotation on the extruder with its groove aligned with the die of the extruder. The arrangement is such that the hose element 20 is drawn about an arc of the pulley 22 into adhesive engagement with the adhesive covering 11 of the first hose element as the first hose element issues from the extruder and the twin hose so formed passes to the driven conveyor 15 against which it is pressed by the roller 16 providing traction. Upon leaving the conveyor 15 the hose is wound on a reel 23.

The tensioning mechanism 19 is illustrated in Figs. 2 and 4 and comprises a base plate 25 supported by a pedestal 26. A side plate 27 is fixed to the base plate and is formed with a vertical guideway in which blocks 28, 29 are slidably mounted. Block 28 has a stub shaft 30 fixed thereto on which a wheel 31, having a removable grooved rim 32, is rotatably mounted.

Block 29 has a similar shaft 33 on which a similar wheel 34 having a removable grooved rim 35 is mounted. The grooved rims are adapted to engage the hose element 12 and for this purpose have their grooves aligned. They may be removed and replaced by rims having grooves of different size or shape to fit other hose elements or strips and are secured in place by latches 36 and 36a. Block 29 is supported on a compression coil spring 37 which urges it upwardly. A second compression coil spring 38 between blocks 28 and 29 normally urges the wheels apart. A pressure screw 40 is slidably fitted through a yoke 41 fixed to plate 27 and impinges against the upper block 28 to which it is secured against rotation, and is adapted to force the wheels together about the hose element to tension the same. A hand wheel 100 has a threaded hub 101 which engages the threads of screw 40. The hub is rotatably journaled in a bearing 102 secured to yoke 41. A collar 103 is secured to the hub below the bearing 102 to retain the hand wheel against vertical movement. The block 28 being secured to the screw 40 and guided vertically in plate 27 prevents turning of the screw. The arrangement is such that as the hand wheel 100 is turned to force the wheels 31, 34 together, tension of the hose element is increased.

For determining the relative speeds of the two hose elements, the measuring mechanism 21, shown in Fig. 6 comprises a base plate 50 mounted on a pedestal 51 and having a vertical plate 52 fixed thereto. A shaft 53 is rotatably journaled in the plate 52 and a bearing 54 is fixed to plate 50, and has a pulley 55 fixed thereto. An arm 56 is pivotally mounted on plate 52, as at 57 and has a grooved roller 58 rotatably mounted thereon above pulley 55. The arrangement is such that hose element 20 passes over pulley 55 and roller 58, which is weighted, rests on the hose element and causes the hose element to drive the pulley at the same surface speed as that of the hose element.

A pulley 60 having the same circumference as pulley 55 is fixed to a shaft 61 rotatably journaled in plate 27 near the tension mechanism. A grooved pressure roller 62 is rotatably mounted on an arm 63 pivoted to plate 27 and aligned with pulley 60 so as to press hose element 12 thereagainst to drive pulley 60 by its frictional engagement with the hose element at the surface speed of hose element 12. A shaft 64 is journaled in a bracket 65 fixed to plate 25 in alignment with shaft 61. A bevel gear 66 is fixed to shaft 64 and an identical bevel gear 67 is fixed to shaft 61 facing it. A differential spider 68 is journaled on shaft 64 between the gears 66 and 67 and rotatably carries a pair of bevel pinions 69, 69a rotatably mounted thereon in positions so that each meshes with both gears 66 and 67. A differential case 68a is fixed to spider 68 for movement with it. The arrangement provides a differential gear movement between shafts 61 and 64. Shaft 64 has a spur gear 70 fixed thereto. A shaft 71 is rotatably journaled parallel to shafts 61 and 64 in a bracket 65 fixed to plate 25 and through plate 27, and has a spur gear 73 equal in size to gear 70 fixed thereto in a position to mesh constantly with gear 70. A flexible shaft 74 has one end fixed to shaft 71 and the other end fixed to shaft 53 so that these shafts rotate in unison. The arrangement is such that when pulleys 55 and 60 are rotated in the directions of feed of the hose elements, and at the same speeds, gears 66 and 67 will be rotated at the same speeds but in opposite directions so that differential spider 68 and its case 68a will be stationary. Should one pulley be rotated faster than the other, the spider 68 and case 68a will be rotated at a differential velocity in one direction or the other which may be observed by the operator.

For controlling the relative speeds of the hose elements 12 and 20, a sprocket 104 is fixed to hand wheel 100. Sprocket 104 is driven by a chain 72 from a sprocket 105 fixed to a speed reducer 106 driven by a reversible electric motor 75. A friction band 76 is rotatably mounted about differential case 68a and is tensioned thereabout by a bolt 77, a coil spring 78 about the bolt being provided to expand the band by pressure applied between its ends. A pair of mercury contact breakers 79, 80 are pivotally mounted on studs 79', 80' fixed to bracket 65. A stop 82 on breaker 79 stands in the path of rotation of a stop pin 84 fixed to band 76, and a stop 83 on breaker 80 stands in the path of rotation of stop pin 84 at a position angularly removed from stop 82. Breakers 79, 80 in their normal positions break control circuits of motor 75 but the arrangement is such that rotation of band 76 in a clockwise direction in Fig. 2 will cause stop 84 to displace stop 83 thereby closing the control circuit of breaker 80 and starting motor 75 whereby sprocket 104 is rotated in a direction to raise screw 40 and wheel 31 so as to loosen tension on hose element 12, and rotation of band 76 in a counter-clockwise direction in Fig. 2 will cause stop 84 to displace stop 82 to close the contact circuit of breaker 79 starting motor 75 in the opposite direction to turn screw 40 and lower wheel 31 to increase tension on hose element 12. The band 76, being able to slide about the differential case 68a, prevents the stop 84 from traveling beyond stops 82, 83 as its turning moment is limited by its frictional engagement with the differential case.

The operation of the apparatus is as follows: An uncovered hose element 12 is drawn from reel 18 between roller 62 and pulley 60 then between tension rollers 31, 34 through extruder 10 and over conveyor belt 15 and under pressure roller 16 to reel 23. An unvulcanized rubber covered hose element 20 is drawn from its reel between pulley 55 and roller 58 and about grooved guide pulley 22 and over conveyor belt 15 and under roller 16 to reel 23. Plastic rubber-like material is supplied to the extruder and is extruded thereby about hose element 12 in adhesive contact with hose element 20. The attendant may observe the differential spider 68 and if this rotates he may adjust tension screw 40 to increase or decrease tension on hose element 12 until the spider ceases rotating. The speed of the conveyor belt 15 may also be increased or decreased to change the pulling speed. Automatic control of speeds is preferably provided, however, by the control of adjustment of screw 40 by the stops 82, 83, 84 controlling the motor 75 as herein described, thereby relieving the operator from constantly watching the differential spider.

The invention makes possible the production of plural-passage hose free from bends due to difference in speed or tension of the hose elements during assembly thereof. While the invention has been illustrated as employed in assembling twin hose, the assembly of other strip elements, especially during a coating operation, may be accomplished to advantage by its use.

Variations may be made without departing from the scope of the invention as it is defined by the following claims.

I claim:

1. Apparatus for progressively assembling a plurality of extensive strip elements into adhesive engagement with each other, said apparatus comprising means for progressively coating one of the strip elements with an adhesive material, means for progressively feeding a second strip element into contact with the adhesive coating on the first said strip element, means for progressively tensioning one of said strip elements, and means responsive to the speed of the other strip element for varying the degree of said tensioning to maintain the strip elements in synchronized speed at their contacting position.

2. Apparatus for progressively assembly a plurality of extensive strip elements into adhesive engagement with each other, said apparatus comprising means for progressively coating one of the strip elements with an adhesive material, means for progressively feeding a second strip element into contact with the adhesive coating on the first said strip element, means for progressively tensioning the first said strip element, and means responsive to the speed of the second strip element for varying the degree of said tensioning of the first strip element to maintain the strip elements in synchronized speed at the contacting position.

3. Apparatus for progressively assembling a plurality of extensive strip elements into adhesive engagement with each other, said apparatus comprising means for progressively extruding an adhesive coating about one of the strip elements, means for progressively feeding a second strip element into contact with the adhesive coating on the first said strip element, means for progressively tensioning the first said strip element, and means responsive to the speed of the second strip element for varying the degree of said tensioning of the first strip element to maintain the strip elements in synchronized speed at the contacting position.

4. Apparatus for progressively assembling a plurality of extensive strip elements, said apparatus comprising means for feeding the elements into assembled relation, a plurality of relatively movable members, means responsive to the speed of one of said elements prior to assembly for moving one of said members in accord with such speed, means responsive to the speed of a second of said elements for moving another of said members in accord with the latter such speed, and means responsive to operation of both aforesaid means for determining difference in speeds of said members.

5. Apparatus for progressively assembling a plurality of extensive strip elements, said apparatus comprising means for feeding the elements into assembled relation, means for adjustably resisting movement of one of said strip elements to vary its speed, means including members in rolling contact with the respective strip elements responsive in movement to the speeds thereof, and means responsive to movement of said members for determining difference in speeds of said strip elements.

6. Apparatus for progressively assembling a plurality of extensive strip elements, said apparatus comprising means for feeding the elements into assembled relation, means for adjustably resisting movement of one of said strip elements to vary its speed, means including members in contact with the respective strip elements responsive in movement to the speeds thereof, a movable member, and means for moving said movable member in response to difference in speeds of the first said members.

7. Apparatus for progressively assembling a plurality of tubular hose elements into adhesive side by side engagement with each other, said apparatus comprising means for progressively forming a coating of adhesive material on one of the elements, means for feeding a second element into contact with the adhesive coating on the first said element, and means for automatically synchronizing the speed of the elements at the contacting position including a rotatable member contacting an uncoated portion of the first said element, a second rotatable member contacting the second said element, and means responsive to difference in speeds of said rotating members for adjusting the feed of one of said elements into synchronism with the feed of the other.

EDWARD A. DAVIS.